Jan. 8, 1929.
D. M. SARKISIAN
1,698,513
BRAKE BAND STRUCTURE
Filed Jan. 28, 1927
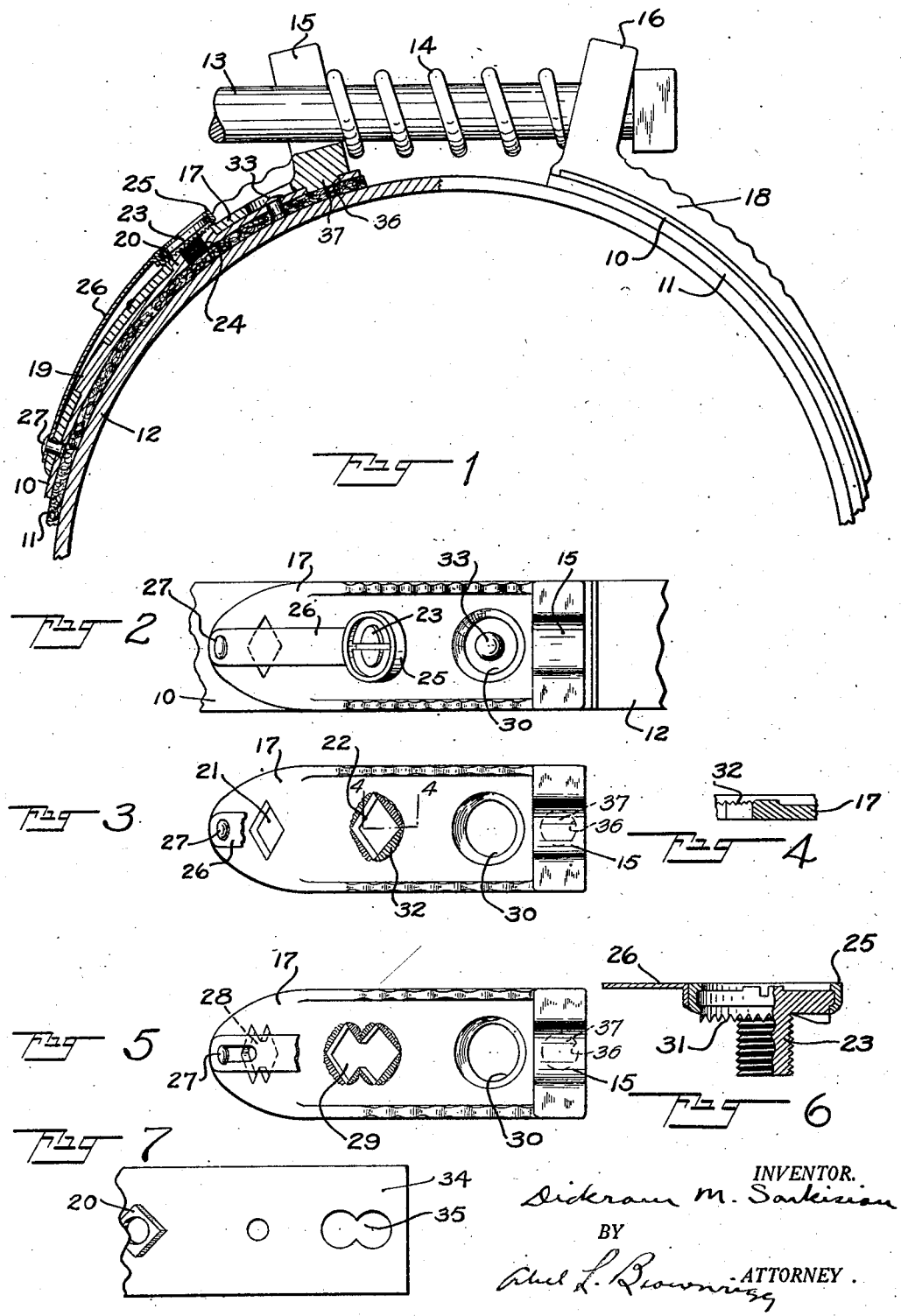
INVENTOR.
Dickran M. Sarkisian
BY
Abel L. Brownrigg
ATTORNEY.

Patented Jan. 8, 1929.

1,698,513

UNITED STATES PATENT OFFICE.

DICKRAN M. SARKISIAN, OF FOREST HILLS, NEW YORK.

BRAKE-BAND STRUCTURE.

Application filed January 28, 1927. Serial No. 164,164.

This invention relates to a brake band structure of the type having a removable end fitting or forked clip member.

It is well known that the fitting of brake bands to the friction drums in the transmission mechanism of Ford gas engines is attained with difficulty because of the restricted space existing between the drums and the enclosing housing through which the brake band must be passed. In order to pass brake band members into position on the drums through the restricted space referred to, it is the practice to make one of the terminal forked clip members carried by the brake band removable so that one end of the band will be free of restrictions against the threading of the band through the space. The removable clip members have been attached in different ways to the brake bands. In some cases, the fittings have been attached in a manner to provide for sliding engagement of the ear longitudinally of the band for a short distance to bring about the engagement of interlocking parts. This is not a favorable construction for the reason that it is difficult in the restricted space available to provide for the longitudinal movement of a clip which is necessary to bring about the locking of the parts. Other forms of the invention have employed removable screws or nuts. This method of attachment is objectionable because the loose parts are likely to fall into the transmission mechanism casing where considerable damage may easily result.

A general object of the present invention is to provide a detachable fitting or clip member which will be free from the objections referred to and which can be securely attached in position with a minimum effort and by the use of only a single tool, a screw driver.

The invention comprises a removable forked clip member having two perforations therein spaced apart along the length of the base of the member to receive upstanding lugs formed for the purpose on the outer face of the metal band which supports the friction material. The lug member which is nearest the end of the band is provided with a threaded opening in which a screw may be received. A screw suited for the purpose is carried by a holder permanently attached through a leaf spring member to the fitting and so positioned that when the fitting is dropped into place in interengagement with the lugs the screw is in position to be pressed into the threaded opening in the outer lug and driven to place by the use of a screw driver.

In a modified form of the invention a double set of openings may be provided in the clip member for the reception of the lugs in order to provide a convenient adjustment of the length of the band member to accommodate friction material in fresh or in worn condition, as may be found desirable.

Other features of the invention will be hereinafter referred to.

In the drawings, in which a number of embodiments of the invention are chosen for illustration:

Fig. 1 is a view partially in side elevation and partially in vertical section of a portion of a brake band structure equipped with a removable forked clip member embodying the invention;

Fig. 2 is a plan view of a preferred form of the invention showing the removable clip member in position on a brake band;

Fig. 3 is a view similar to Fig. 2 showing the removable clip member detached from the brake band;

Fig. 4 is a sectional view on an enlarged scale taken on the line 4—4 of Fig. 3;

Fig. 5 is a view similar to Fig. 3 showing a modified form of the invention;

Fig. 6 is a sectional view on an enlarged scale of a detail of the invention showing an attaching screw and a holder therefor;

Fig. 7 is a plan view of an end portion of a modified band member embodying a part of the invention.

Referring to the drawings for a more detailed description of the invention, in Fig. 1 there is shown a brake band structure in which a resilient metal band 10 supports a frictional brake lining 11 which is attached to the band 10 in any suitable manner, such as by rivets or the like. The band, equipped with the lining 11, is adapted to be placed in position on a friction drum 12 and to be actuated and drawn into gripping relation to the drum or to be released therefrom through an actuating rod 13 and a spring member 14 acting to press apart the forked extremities 15 and 16 of a pair of clip members 17 and 18.

In order to enable the brake band to be passed into position around the drum through the restricted space available, the clip member 17 is formed to be readily detached from and attached to the corresponding end of the brake band 10. In order to achieve this useful result, the brake band 10 is provided with a pair of upstanding lugs 19 and 20, which are spaced apart longitudinally of the band, as is clearly shown in Fig. 1 of the drawings. The removable clip member 17 is provided with a pair of openings 21 and 22 adapted to fit over the upstanding lugs 19 and 20. It will be seen that the lugs and openings are substantially square in formation with their angles extending longitudinally of the respective parts. This arrangement facilitates the threading of the band through the space in that the angular edges of the studs or lugs do not oppose movement of the band into position:

In order to mount the removable clip member 17 into position on the band member, it is merely dropped into place with the openings 21 and 22 in register with and receiving relation to the upstanding lugs 19 and 20. In order to securely attach the clip member in place, an attaching screw 23 is provided which is adapted to be driven to place in a threaded opening 24 formed in the lug 20.

In order to obviate dropping of the screw 23 into the transmission housing, the screw is held in a holder 25 which has a spring extension 26 attached at its other end as at 27 to the body of the clip member. With this arrangement, the screw 23 is resiliently held in position in the opening 22 in the clip member and in alignment with the threaded opening 24 when the clip member is placed in position on the band. The head of the screw member 23 is rotatably mounted in a seat formed for the purpose in the holder 25 so that the application of a screw driver to the slot in the screw head serves not only to force the spring into engagement with the adjacent end of the threaded opening 24 but also to drive the screw into its holding position in the threaded opening.

It will be seen that I have provided a simple and effective method of holding the clip member in place. The mounting of the screw in a resilient holder in position to be driven into the threaded opening in the lug 20 greatly facilitates the operation of securing the clip member in place since only a single tool, a screw driver, is required to attach the clip member to the band.

In a modified form of the invention shown in Fig. 5, a double set of openings 28 and 29 are provided in order to obtain a longitudinal adjustment of the clip member 17 with relation to the band 10 in order to provide for taking up clearance when the friction lining 11 becomes worn. As I have shown the double set of openings 28 and 29, they merge into each other and are thereby spaced apart on centers such as will normally take up the slack produced by the wear of the friction lining. It will be seen that in either form of the invention longitudinal or sliding movement of the forked clip member with relation to the band is wholly prevented and thereby a certainty and facility of operation is achieved which is lacking in the devices in which sliding movement is provided.

An opening 30 is preferably provided in the clip member 17 to accommodate the head 33 of a rivet positioned to hold the end portion of the lining 11 to the band 10 and to prevent interference with a close fit of the clip member against the outer surface of the brake band.

I preferably enhance the rigidity of seating of the clip member 17 on the band 10 by providing an opening 36 in the band into which a lug 37 formed on the under surface of the clip member projects with a relatively close fit. The opening 36 in the band also functions to receive a hook member by means of which the band is drawn into position around the drum.

In Figure 7 of the drawing the band 34 is provided with a double opening 35 to accommodate the adjustable positioning of the clip member which has already been referred to.

A feature of the invention resides in the provision of a corrugated surface 31 on the under face of the head of the screw 23. A corresponding corrugated surface 32 is provided on the outer face of the clip member adjacent the edges of the opening 22. With this structural arrangement, the screw is locked in position and retained therein so that it will not be shaken loose from its position in the lug.

What I claim is:

1. In a brake band structure, a band member provided with a pair of longitudinally spaced apart lugs having a square formation with their corners extending transversely and longitudinally of the band, a terminal fitting provided with openings formed to receive said lugs, the lug nearest the end of the band being provided with a threaded opening, a screw adapted to be received in said opening to clamp the fitting in place, and a retainer for the screw attached to the fitting.

2. In a brake band structure, a band member provided with a pair of longitudinally spaced apart lugs, a terminal fitting provided with two sets of openings formed to adjustably receive said lugs, one of said lugs having a threaded opening, a screw adapted to be received in said opening to clamp the fitting in place, and a retainer for the screw carried by the fitting.

DICKRAN M. SARKISIAN.